(12) United States Patent
Li et al.

(10) Patent No.: US 10,913,110 B2
(45) Date of Patent: Feb. 9, 2021

(54) APPARATUS FOR HIGH-THROUGHPUT SCREW CASTER OF MULTI-COMPONENT GRADIENT METAL MATERIAL

(71) Applicant: UNIVERSITY OF SCIENCE AND TECHNOLOGY BEIJING, Beijing (CN)

(72) Inventors: Jingyuan Li, Beijing (CN); Mingfan Qi, Beijing (CN); Yulai Chen, Beijing (CN); Huiping Hong, Beijing (CN); Jianxin Xie, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 203 days.

(21) Appl. No.: 16/169,570

(22) Filed: Oct. 24, 2018

(65) Prior Publication Data

US 2019/0054521 A1 Feb. 21, 2019

Related U.S. Application Data

(63) Continuation-in-part of application No. PCT/CN2017/086077, filed on May 26, 2017.

(30) Foreign Application Priority Data

Apr. 26, 2016 (CN) .......................... 2016 1 0267117

(51) Int. Cl.
| | |
|---|---|
| *B22D 11/16* | (2006.01) |
| *B22D 25/06* | (2006.01) |
| *B22D 11/114* | (2006.01) |
| *B29C 67/00* | (2017.01) |
| *B22D 11/10* | (2006.01) |

(Continued)

(52) U.S. Cl.
CPC .......... *B22D 11/165* (2013.01); *B22D 11/006* (2013.01); *B22D 11/10* (2013.01); *B22D 11/114* (2013.01); *B22D 11/124* (2013.01); *B22D 11/22* (2013.01); *B22D 17/2061* (2013.01); *B22D 25/06* (2013.01); *B22D 30/00* (2013.01); *B29C 67/00* (2013.01); *B33Y 10/00* (2014.12); *B33Y 30/00* (2014.12); *B33Y 70/00* (2014.12);

(Continued)

(58) Field of Classification Search
CPC ....... B22D 11/00; B22D 11/006; B22D 11/10; B22D 11/114; B22D 11/124; B22D 11/16; B22D 11/165; B22D 11/22; B22D 17/20; B22D 17/2061; B22D 25/06; B22D 30/00
USPC ........................................ 164/303, 900, 452
See application file for complete search history.

(56) References Cited

U.S. PATENT DOCUMENTS 5,653,534 A * 8/1997 Matsumoto et al. ....................... B29C 48/022
366/76.1

FOREIGN PATENT DOCUMENTS

| CN | 101020230 A | 8/2007 |
|---|---|---|
| CN | 104117643 A | 10/2014 |

(Continued)

*Primary Examiner* — Kevin P Kerns
(74) *Attorney, Agent, or Firm* — Novick, Kim & Lee, PLLC; Allen Xue

(57) ABSTRACT

An apparatus for a high-throughput screw caster of a multi-component gradient metal material from elongate materials, such as multi-component alloy pipes, rods, profiles, and other such materials, has in the lengthwise direction a continuous gradient distribution of chemical components. The apparatus includes an online powder flow-rate regula- (Continued)

tion system, a rotary feed system, a heating system, a heat insulation system, a motor drive system, a blank forming system and a control system.

6 Claims, 2 Drawing Sheets

(51) Int. Cl.
*B33Y 30/00* (2015.01)
*B33Y 10/00* (2015.01)
*B33Y 70/00* (2020.01)
*B22D 11/00* (2006.01)
*B22D 11/124* (2006.01)
*B22D 11/22* (2006.01)
*B22D 17/20* (2006.01)
*B22D 30/00* (2006.01)
*C22C 1/04* (2006.01)

(52) U.S. Cl.
CPC ............ *C22C 1/04* (2013.01); *B22F 2207/01* (2013.01); *B22F 2998/10* (2013.01)

(56) References Cited

FOREIGN PATENT DOCUMENTS

| | | |
|---|---|---|
| CN | 104117644 A | 10/2014 |
| CN | 104552944 A | 4/2015 |
| CN | 105328181 A | 2/2016 |
| JP | H11129059 A | 5/1999 |
| JP | 2003112255 A | 4/2003 |
| JP | 2004009052 A | 1/2004 |

* cited by examiner

APPARATUS FOR HIGH-THROUGHPUT SCREW CASTER OF MULTI-COMPONENT GRADIENT METAL MATERIAL

TECHNICAL FIELD

The present invention belongs to the field of metal fabrication and processing, and particularly relates to an apparatus for forming elongate materials, such as multi-component alloy pipes, rods, profiles, and other such materials, having in the lengthwise direction a continuous gradient distribution of chemical components, which may realize high-throughput fabrication of a multi-component gradient metal material.

BACKGROUND

Metal materials and metal matrix composites have always been the most demanding and widely used materials for military and civilian applications due to their features such as high strength, high toughness, good formability and fatigue resistance. However, the development and application of the metal materials often rely on traditional material methods such as scientific intuition, human experience and a trial-and-error method. Long cycle and high cost have become the bottleneck restricting economic and social development and technological progress. At present, key problems restricting light metal materials and light metal matrix composites are strength and corrosion resistance. Generally, methods such as an alloy element composition adjustment method and a heat treatment process are employed to improve the comprehensive performance of single-furnace alloy melting. However, an existing one-time melting method can only fabricate an alloy including one component, and has disadvantages of low efficiency, long cycle and high cost. Accordingly, material research methods need to be innovated, and new methods and technologies for accelerating the time course from the discovery to the application of new materials have received extensive attention at home and abroad.

SUMMARY

In view of the above background, it is an object of the present invention to provide an apparatus for a high-throughput screw caster, which may greatly shorten the time course of from design, fabrication, and characterization to application of a multi-component metal material, reduce the development cost, and have a simple process.

A technical solution of the present invention is as follows: an apparatus for a high-throughput screw caster of a multi-component gradient metal material includes an online powder flow-rate regulation system, a rotary feed system, a heating system, a heat insulation system, a motor drive system, a blank forming system and a control system;

The online powder flow-rate regulation system is configured to control feed rates of a plurality of metal powders, that is, different ratios of the powders, the online powder flow-rate regulation system includes at least two metal powder storages, dynamic flow-rate control valves and an intermediate storage; the at least two metal powder storages are connected with feeding holes of an intermediate storage through feeding pipelines, and the dynamic flow-rate control valves are disposed on the feeding pipelines; the online powder flow-rate regulation system is further configured to control completion of continuous feeding of the metal powders with different ratios; the continuously fed metal powders enter the rotary feed system through the feeding pipelines in sequence after passing through the intermediate storage.

The rotary feed system includes a cylindrical barrel and a screw rod; a feeding hole is disposed in the upper end of a side wall of the cylindrical barrel and connected with the feeding pipelines through a pipeline, and the screw rod is disposed inside the cylindrical barrel; an outer diameter of the screw rod is equal to an inner diameter of the cylindrical barrel, such that the above-mentioned metal powders with different ratios is distributed in sequence within a gap of the screw rod after entering the barrel, and is not mixed and homogenized after being molten under a heating condition; a conical discharging hole is disposed in a bottom of the cylindrical barrel.

The heating system is configured to melt mixed metal powders having different components, entered into the cylindrical barrel; the heating apparatus is disposed on a side wall of the cylindrical barrel.

The heat insulation system is a heat insulation jacket disposed on an outer side wall of the induction heater.

The motor drive system includes a drive motor, a drive shaft and a drive shaft connector, wherein the drive motor is in drive connection with of the screw rod through the drive shaft and the drive shaft connector; a joint between the drive shaft connector and the cylindrical barrel is sealed by a sealing ring.

The blank forming system includes a mold, condensation crystallizers and a drawing apparatus; the mold is disposed at a lower end of the conical discharging hole, the condensation crystallizers are disposed at two sides of the conical discharging hole inside the mold, and the drawing apparatus is disposed at a lower end of a discharging hole of the mold; and the powders with different ratios are sequentially molten according to a feeding order within the cylindrical barrel and then flow into the conical discharging hole along the helical gap of the screw rod, so that a multi-component gradient metal material is fabricated in a draw-casting manner under a common action of the mold, the condensation crystallizers and the drawing apparatus.

The control system includes an upper computer and a control signal processor; and the upper computer is in control connection with the drive motor, the dynamic flow-rate control valves and the induction heater through the control signal processor.

Furthermore, a ratio of the inner diameter $D_B$ of the cylindrical barrel to a root diameter $D_0$ of the screw rod is 1.5-8:1; an outer diameter of the screw rod is equal to an inner diameter of the cylindrical barrel, and there is no gap between the screw rod and the cylindrical barrel, such that a feeding movement of the mixed powders, components of which continuously change, and a flowing procedure of the mixed powder after being molten within the barrel are ordered and controllable, and the powders with different components and a melt will not be mixed and homogenized.

Furthermore, an axial distance between flights of the screw rod is B (i.e., pitch of the screw); and $B=D_B \tan \Phi$, wherein $D_B$ represents the inner diameter of the barrel, and $\Phi$ represents a helix angle of 30° to 60° of the screw rod.

A method for using the above apparatus, includes the following steps:

step 1, respectively adding corresponding metal powders into powder storages (1) according to the number of alloy components and a variation gradient of the components, controlling dynamic flow-rate control valves (2) by an upper computer (11) to obtain contents of the metal powders required every time, sequentially making the metal powders enter into an intermediate storage (3) for being uniformly stirred and mixed to obtain mixed powders, components of which continuously change, and feeding the metal powders into a barrel (13) through feeding pipelines and a feeding hole (8); and meanwhile, driving a screw rod by the upper computer (11) through a drive motor (4) to rotate at a rotation speed r; and step 2, after entering into the barrel (13), flowing the mixed powders under the drive of the screw rod (14), wherein there is no gap between a spiral blade of the screw rod (14) and inner wall of the barrel (13), such that the movement procedure of the mixed powder, components of which continuously change, is ordered and controllable, and the components will not be mixed and homogenized, and;

step 3, controlling a heating system (15) by the upper computer (11) to heat the barrel at a certain power P, sequentially melting the mixed powders, components of which continuously change, according to a feeding order under an action of the heating system (15), and making the molten metal powders flow in sequence along a gap formed between the screw rod and the inner wall of the barrel, and enter into a mold (17) through a discharging hole (12) in a bottom of the barrel (13), solidifying the molten metal under a condensation action of condensation crystallizers (18), and finally fabricate a metal blank (20), components of which continuously change, under the action of a drawing apparatus (19), so that high-throughput fabrication of a multi-component gradient metal material is achieved.

Furthermore, the rotation speed r of the screw rod (4) in the step 1 is calculated by the following formula:

$$r = (v_e D_e^2 \cos \Phi) / \{(D_B^2 - D_S^2) \cdot B\},$$

wherein r represents the rotation speed of the screw rod; $\Phi$ represents a helix angle of the screw rod; $D_S$ represents a diameter of the screw rod; $D_B$ represents an inner diameter of the cylindrical barrel; $D_e$ represents a diameter of the feeding hole; $v_e$ represents a feeding speed and a discharging speed; and B represents an axial distance between flights.

Furthermore, the heating power P in the step 3 is calculated by the following formula:

$$P \geq \{rBC\rho V(T_m - T_0)\} / (L \cdot \eta),$$

wherein P represents the heating power; r represents a rotation speed of the screw rod; B represents an axial distance between flights; C represents a specific heat capacity of the material; $\rho$ represents a density of a fabricated gradient material; V represents a unit transport volume of the material; $T_m$ represents a melting point of the material; $T_0$ represents an initial temperature of the material; L represents a length of the cylindrical barrel itself; and $\eta$ represents a heat absorption efficiency of the material.

The apparatus of the present invention has advantages of simple structure, convenience in use, easy control and the like. The apparatus realizes high-throughput fabrication of a multi-component metal sample by online control on components of a molten metal and a continuous casting process, which significantly improves the fabrication efficiency and reduces the research and development costs.

1, metal powder storage; 2, dynamic flow-rate control valve; 3, intermediate storage; 4, drive motor; 5, drive shaft; 6, drive shaft connector; 7, fixed bolt; 8, feeding hole; 9, sealing ring; 10, control signal processor; 11, upper computer; 12, discharging hole; 13, barrel; 14, screw rod; 15, induction heater, 16, heat insulation jacket; 17, mold; 18, condensation crystallizer; 19, drawing apparatus; and 20, blank.

DETAILED DESCRIPTION

A technical solution of the present invention will be further described below in combination with accompanying drawings and specific embodiments.

Figure 1:
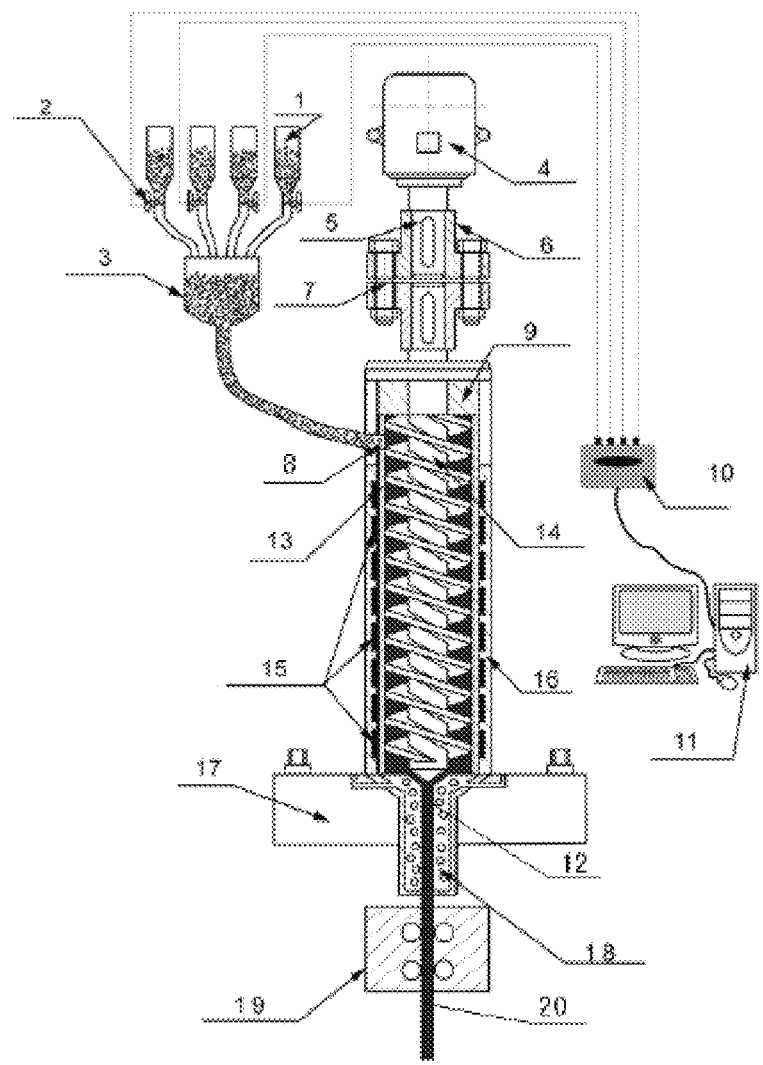
FIG. 1 is a structural diagram of an apparatus for a high-throughput screw caster of a multi-component gradient metal material according to the present invention.
Figure 2:
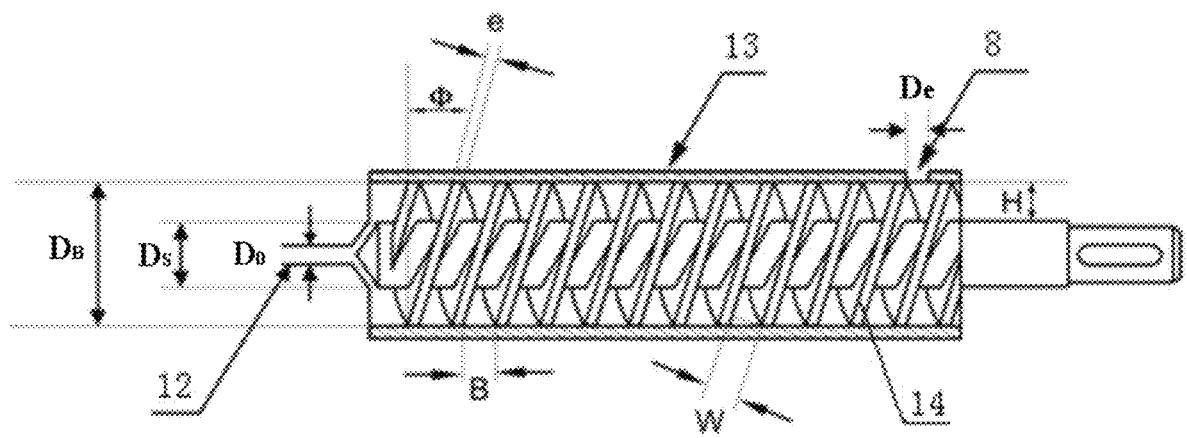
FIG. 2 is a structural diagram of a rotary feed system of an apparatus for a high-throughput screw caster of a multi-component gradient metal material.

As shown in FIG. 1 to FIG. 2, they are structural diagrams of an apparatus for high-throughput fabrication of a multi-component gradient metal material. The apparatus includes an online powder flow-rate regulation system, a rotary feed system, a heating system, a heat insulation system, a motor drive system, a blank forming system and a control system;

wherein the online powder flow-rate regulation system is configured to control feed rates of a plurality of metal powders, that is, different ratios of the powders, the online powder flow-rate regulation system includes at least two metal powder storages, dynamic flow-rate control valves and an intermediate storage; the at least two metal powder storages are connected with feeding holes of the intermediate storage through feeding pipelines, and the dynamic flow-rate control valves are disposed on the feeding pipelines; the online powder flow-rate regulation system is further configured to control completion of continuous feeding of the metal powders with different ratios; the continuously fed metal powders enter the rotary feed system through the feeding pipelines in sequence after passing through the intermediate storage;

the rotary feed system includes a cylindrical barrel and a screw rod; a feeding hole is disposed in the upper end of a side wall of the cylindrical barrel and connected with the feeding pipelines through a pipeline, and the screw rod is disposed inside the cylindrical barrel; an outer diameter of the screw rod is equal to an inner diameter of the cylindrical barrel, such that the above-mentioned metal powders with different ratios is distributed in sequence within a gap of the screw rod after entering the barrel, and is not mixed and homogenized after being molten under a heating condition; a conical discharging hole is disposed in a bottom of the cylindrical barrel;

the heating system is an induction heater, which is configured to melt mixed metal powders having different components, entered into the cylindrical barrel, and the heating apparatus is disposed on a side wall of the cylindrical barrel;

the heat insulation system is a heat insulation jacket disposed on an outer side wall of the induction heater;

the motor drive system includes a drive motor, a drive shaft and a drive shaft connector, wherein the drive motor in drive connection with of the screw rod through the drive shaft and the drive shaft connector; a joint between the drive shaft connector and the cylindrical barrel is sealed by a sealing ring;

the blank forming system includes a mold, condensation crystallizers and a drawing apparatus; the mold is disposed at a lower end of the conical discharging hole, the condensation crystallizers are disposed at two sides of the conical discharging hole inside the mold, and the drawing apparatus is disposed at a lower end of a discharging hole of the mold; the powders with different ratios are sequentially molten according to a feeding order within the cylindrical barrel and then flow into the conical discharging hole along the helical gap of the screw rod, so that a multi-component gradient metal material is fabricated in a draw-casting manner under a common action of the mold, the condensation crystallizers 5 and the drawing apparatus; and the control system includes an upper computer and a control signal processor; and the upper computer is in control connection with the drive motor, the dynamic flow rate control valves and the induction heater through the control signal processor.

In the apparatus for a high-throughput screw caster of a multi-component gradient metal material, a ratio of the inner diameter $D_B$ of the cylindrical barrel to a root diameter $D_0$ of the screw rod is 1.5-8:1; an outer diameter of the screw rod is equal to an inner diameter of the cylindrical barrel, and there is no gap between the screw rod and the cylindrical barrel, such that a feeding movement of the mixed powders, components of which continuously change, and a flowing procedure of the mixed powder after being molten within the barrel are ordered and controllable, and the powders with different components and a melt will not be mixed and homogenized.

In the apparatus for a high-throughput screw caster of a multi-component gradient metal material, an axial distance between flights of the screw rod is B; and $B=D_B \tan \Phi$, wherein $D_B$ represents the inner diameter of the barrel, and $\Phi$ represents a helix angle of 30° to 60° of the screw rod. The width of the flight on the screw rod is e, while the distance between two opposing surfaces of two consecutive flights in the direction perpendicular to the flight surface is W. Further, the distance between the outer surface of the drive shaft and the inner wall of the barrel (13) is H.

A method of using the above apparatus, includes the following steps:

step 1, respectively adding corresponding metal powders into powder storages (1) according to the number of alloy components and a variation gradient of the components, controlling dynamic flow-rate control valves (2) by an upper computer (11) to obtain contents of the metal powders required every time, sequentially making the metal powders enter into an intermediate storage (3) for being uniformly stirred and mixed to obtain mixed powders, components of which continuously change, and feeding the metal powders into a barrel (13) through feeding pipelines and a feeding hole (8), and meanwhile, driving a screw rod by the upper computer (11) through a drive motor (4) to rotate at a rotation speed r;

step 2, after entering into the barrel (13), flowing the mixed powders under the drive of the screw rod (14), wherein there is no gap between a flight of the screw rod (14) and the inner wall of the barrel (13), such that the movement procedure of the mixed powder components of which continuously change is ordered and controllable, and the components will not be mixed and homogenized; and step 3, controlling a heating system (15) by the upper computer (11) to heat the barrel at a certain power P, sequentially melting the mixed powders, components of which continuously change, according to a feeding order under an action of the heating system (15), and making the molten metal powders flow in sequence along a gap formed between the screw rod and the inner wall of the barrel, and enter into a mold (17) through a discharging hole (12) in the bottom of the barrel (13), solidifying the molten metal under a condensation action of condensation crystallizers (18) and finally fabricate a metal blank (20) components of which continuously change under the action of a drawing apparatus (19), so that high-throughput fabrication of a multi-component gradient metal material is achieved.

Furthermore, the rotation speed r of the screw rod (4) in the step 1 is calculated by the following formula:

$$r=(veDe^2 \cos \Phi)/\{(D_B^2-D_S^2) \cdot B\},$$

wherein r represents the rotation speed of the screw rod; $\Phi$ represents a helix angle of the screw rod; $D_S$ represents a diameter of the screw rod; $D_B$ represents an inner diameter of the cylindrical barrel; $D_e$ represents a diameter of the feeding hole; $v_e$ represents a feeding speed and a discharging speed; and B represents an axial distance between flights.

Furthermore, a heating power P in the step 3 is calculated by the following formula:

$$P \geq \{rBC\rho V(T_m-T_0)\}/(L \cdot \eta),$$

wherein P represents the heating power; r represents a rotation speed of the screw rod; B represents an axial distance between flights; C represents a specific heat capacity of the material; $\rho$ represents a density of a fabricated gradient material; V represents a unit transport volume of the material; $T_m$ represents a melting point of the material; $T_0$ represents an initial temperature of the material; L represents a length of the cylindrical barrel itself; and $\eta$ represents a heat absorption efficiency of the material.

The raw material is molten into a molten metal under the heating of the induction heater (15), and the molten metal reaches the bottom of the barrel (13) and enters into the mold (17) through the discharging hole (12), solidifies under a condensation action of condensation crystallizers (18), and finally forms a metal blank (20) components of which continuously change under the action of a drawing apparatus (19), so that high-throughput fabrication of a multi-component gradient metal material is achieved.

EXAMPLE 5 kg of a 1000-mesh metal pure magnesium powder was weighed, 0.3 kg of a 1000-mesh metal pure zinc powder was weighed, and the above raw material powders were respectively placed in different metal powder storages for use.

Dynamic flow-rate control valves were controlled by a control system, so that flow rates of the powders in the two metal powder storages were different, and further a mixed Mg/Zn metal powder with a Zn content ranging from 0% to 6% was obtained.

A rotation speed of a screw rod is adjusted according to the flow rates of the metal powders in a feeding hole:

$$r=(veDe^2 \cos \Phi)/\{(D_B^2-D_S^2) \cdot B\},$$

wherein a feeding rate $v_e$ is $1 \times 10^5$ mm/min; an inner diameter $D_B$ of the barrel is 150 mm, a root diameter $D_s$ of the screw rod is 50 mm; a diameter $D_e$ of the feeding hole is 20 mm; an axial distance B between flights is 50 mm; and a helix angle $\Phi$ of the screw rod is 37°, so that the rotation speed r of the screw rod is calculated to be 32 revolutions/min.

A heating power needs to be adjusted according to different raw materials and different rotation speeds of the screw rod:

$$P \geq \{rBC\rho V(T_m-T_0)\}/(L \cdot \eta),$$

wherein the rotation speed r of the screw rod is 32 revolutions/min;

the axial distance B between the flights is 50 mm;

a specific heat capacity $C_{Mg}$ of pure magnesium is 1.025 J/(g·K), and a specific heat capacity $C_{Zn}$ of pure zinc is 0.38

J/(g·K). Therefore, in order to ensure that the heating power is large enough, the specific heat capacity C is taken as 1.025 J/(g·K);

because the density ρ of the fabricated gradient metal material varies from 1.738 g/cm$^3$ to 2.074 g/cm$^3$, in order to ensure that the heating power may meet the requirements, the heating power takes the maximum value, so that ρ=2.074 g/cm$^3$;

a unit transport volume of the material is equal to 3.14× 10$^4$ cm$^3$;

because a melting point of the pure magnesium is relatively high, a melting point T$_m$ of the material is 648° C., and an initial temperature of the material is 25° C.;

a length L of the cylindrical barrel is 700 mm; and

η is a heat absorption efficiency of the material and is taken as 0.8.

Accordingly, the heating power P may be calculated to be greater than or equal to 1660 kW.

When the molten metal reaches the discharging hole, a drawing speed is controlled to ensure that a feeding speed is equal to a discharging speed, so that under the action of cooling water, a Mg—Zn gradient metal blank with a Zn component ranging from 0% to 6% is fabricated.

What is claimed is:

1. An apparatus for a screw caster of a multi-component gradient metal material, comprising an online powder flow-rate regulation system, a rotary feed system, a heating system, a heat insulation system, a motor drive system, a blank forming system and a control system;
    wherein the online powder flow-rate regulation system comprises at least two metal powder storages, dynamic flow-rate control valves and an intermediate storage; and is configured to control feed rates of the at least two metal powders into the intermediate storage so as to control ratios of the at least two metal powders in a mixed metal powder in the intermediate storage,
    wherein the at least two metal powder storages are connected with feeding holes of the intermediate storage through feeding pipelines, and the dynamic flow-rate control valves are disposed on the feeding pipelines; the online powder flow-rate regulation system is further configured to control completion of continuous feeding of the mixed metal powder from the intermediate storage into the rotary feed system through the feeding pipelines in sequence;
    the rotary feed system comprises a cylindrical barrel and a screw rod; a feeding hole is disposed in an upper end of a side wall of the cylindrical barrel and connected with the feeding pipelines through a pipeline, and the screw rod is disposed inside the cylindrical barrel; an outer diameter of the screw rod is equal to an inner diameter of the cylindrical barrel, such that the mixed metal powder is fed in sequence within a gap of the screw rod after entering the barrel so that it is not further mixed and homogenized in the cylindrical barrel after being molten under a heating condition; a conical discharging hole is disposed in a bottom of the cylindrical barrel;
    the heating system is configured to melt the mixed metal powder entered into the cylindrical barrel; a heating apparatus is disposed on a side wall of the cylindrical barrel;
    the heat insulation system is a heat insulation jacket disposed on an outer side wall of an induction heater;
    the motor drive system comprises a drive motor, a drive shaft and a drive shaft connector,
    wherein the drive motor is in drive connection with the screw rod through the drive shaft and the drive shaft connector; and a joint between the drive shaft connector and the cylindrical barrel is sealed by a sealing ring;
    the blank forming system comprises a mold, condensation crystallizers and a drawing apparatus;
    the mold is disposed at a lower end of a conical discharging hole, the condensation crystallizers are disposed at two sides of the conical discharging hole inside the mold, and the drawing apparatus is disposed at a lower end of the conical discharging hole of the mold;
    the powders are sequentially molten according to a feeding order within the cylindrical barrel and then flow into the conical discharging hole along a helical gap of the screw rod, so that a multi-component gradient metal material is fabricated in a draw-casting manner under a common action of the mold, the condensation crystallizers and the drawing apparatus; and
    the control system comprises an upper computer and a control signal processor; and the upper computer is in control connection with the drive motor, the dynamic flow rate control valves and the induction heater through the control signal processor.

2. The apparatus according to claim 1, wherein a ratio of an inner diameter D$_B$ of the cylindrical barrel to a root diameter D$_0$ of the screw rod is 1.5-8:1; an outer diameter of the screw rod is equal to an inner diameter of the cylindrical barrel, and there is no gap between the screw rod and the cylindrical barrel, such that a feeding movement of the mixed metal powder, components of which continuously change, and a flowing procedure of the mixed metal powder after being molten within the barrel are ordered and controllable, and the powders with different components and a melt are mixed and homogenized.

3. The apparatus according to claim 1, wherein an axial distance between two consecutive flights of the screw rod is B; and B=D$_B$ tan Φ, wherein D$_B$ represents the inner diameter of the barrel, and Φ represents a helix angle of 30° to 60° of the screw rod.

4. A method for using the apparatus according to claim 1, comprising the following steps:
    step 1, respectively adding corresponding metal powders into powder storages (1) according to the number of alloy components and a variation gradient of the components, controlling dynamic flow-rate control valves (2) by an upper computer (11) to obtain contents of the metal powders required every time, sequentially making the metal powders enter into an intermediate storage (3) for being uniformly stirred and mixed to obtain a mixed metal powder in the intermediate storage, components of which continuously change, and feeding the mixed metal powder into a barrel (13) through feeding pipelines and a feeding hole (8), and meanwhile, driving a screw rod by the upper computer (11) through a drive motor (4) to rotate at a rotation speed r;
    step 2, after entering into the barrel (13) and flowing the mixed metal powder driven by the screw rod (14), wherein there is no gap between a spiral blade of the screw rod (14) and the inner wall of the barrel (13), such that a movement procedure of the mixed metal powder, components of which continuously change, is ordered and controllable, and the components are not further mixed and homogenized in the barrel; and
    step 3, controlling a heating system (15) by the upper computer (11) to heat the barrel at a certain power to melt the mixed metal powder, components of which continuously change, according to a feeding order under an action of the heating system (15), and making a molten metal powder flow in sequence along a gap formed between the screw rod and the inner wall of the barrel, and enter into a mold (17) through a discharging hole (12) in the bottom of the barrel (13), solidifying the molten metal powder under a condensation action of condensation crystallizers (18) and finally fabricate a metal blank (20) components of which continuously change under the action of a drawing apparatus (19), so that a fabrication of a multi-component gradient metal material is achieved.

5. The method according to claim 4, wherein a rotation speed r of the screw rod in the step 1 is calculated by the following formula:

$$r = (v_e D_e^2 \cos \Phi)/\{(D_B^2 - D_S^2) \cdot B\},$$

wherein r represents the rotation speed of the screw rod; $\Phi$ represents a helix angle of the screw rod; $D_S$ represents a diameter of the screw rod; $D_B$ represents an inner diameter of the cylindrical barrel; $D_e$ represents a diameter of the feeding hole; $v_e$ represents a feeding speed and a discharging speed; and B represents an axial distance between two consecutive flights.

6. The method according to claim 4, wherein the heating power P in the step 3 is calculated by the following formula:

$$P \geq \{rBC\rho V(T_m - T_0)\}/(L \cdot \eta),$$

wherein P represents the heating power; r represents a rotation speed of the screw rod; B represents an axial distance between two consecutive flights; C represents a specific heat capacity of the material; $\rho$ represents a density of a fabricated gradient material; V represents a unit transport volume of the material; $T_m$ represents a melting point of the material; $T_0$ represents an initial temperature of the material; L represents a length of the cylindrical barrel itself; and $\eta$ represents a heat absorption efficiency of a material being heated.

* * * * *